(12) United States Patent
Dybro

(10) Patent No.: US 12,702,088 B2
(45) Date of Patent: Aug. 11, 2026

(54) SYSTEM AND METHOD FOR AUTOMATICALLY CONTROLLING WORK VEHICLE OPERATION

(71) Applicant: CNH Industrial America LLC, New Holland, PA (US)

(72) Inventor: Niels Dybro, Muscatine, IA (US)

(73) Assignee: CNH Industrial America LLC, New Holland, PA (US)

( * ) Notice: Subject to any disclaimer, the term of this patent is extended or adjusted under 35 U.S.C. 154(b) by 105 days.

(21) Appl. No.: 18/107,873

(22) Filed: Feb. 9, 2023

(65) Prior Publication Data

US 2024/0268267 A1 Aug. 15, 2024

(51) Int. Cl.
*A01D 41/127* (2006.01)

(52) U.S. Cl.
CPC .................................. *A01D 41/127* (2013.01)

(58) Field of Classification Search
CPC .................................................... A01D 41/127
See application file for complete search history.

(56) References Cited

U.S. PATENT DOCUMENTS 7,610,125 B2 10/2009 Fitzner et al.
8,924,030 B2 12/2014 Wendte et al.
10,980,166 B2 4/2021 Stanhope et al.
11,240,962 B2 2/2022 Kriebel et al.
11,474,523 B2 10/2022 Vandike et al.
2018/0000011 A1 1/2018 Schleusner et al.
2020/0323135 A1 10/2020 Blank et al.
2020/0402184 A1 12/2020 Dasgupta et al.
2021/0015041 A1 1/2021 Bormann et al.
2021/0120736 A1 4/2021 Wang et al.
2021/0176916 A1 6/2021 Sidon et al.
2021/0209490 A1 7/2021 Casas et al.
2022/0110250 A1* 4/2022 Vandike ............. G01B 11/0608
2022/0132723 A1* 5/2022 Anderson ............. G01C 21/20
701/25
2022/0232763 A1 7/2022 Palla et al.

OTHER PUBLICATIONS

European Search Report issued in corresponding Application No. EP 24156818.7 Dated Jun. 24, 2024 (12 pages).

* cited by examiner

*Primary Examiner* — Adnan M Mirza
(74) *Attorney, Agent, or Firm* — Dority & Manning, P.A.

(57) ABSTRACT

A system for automatically controlling work vehicle operation includes a remote computing system configured to determine settings for the vehicle and expected outcomes at a plurality of locations within a field/work site. Furthermore, the remote computing system is configured to generate a map identifying the settings and the expected outcomes at each location. Additionally, an onboard computing system is configured to control the operation of the vehicle based on the map as the vehicle traverses the field/work site. Moreover, the onboard computing system is configured to determine actual outcomes at each of location as the vehicle traverses the field/work site. In addition, the onboard computing system is configured to compare the actual outcomes and the expected outcomes at each location and apply one or more offsets to the settings when the actual outcomes differ from the expected outcomes by more than a threshold amount.

20 Claims, 5 Drawing Sheets

SYSTEM AND METHOD FOR AUTOMATICALLY CONTROLLING WORK VEHICLE OPERATION

FIELD OF THE INVENTION

The present disclosure generally relates to work vehicles and, more particularly, to systems and methods for automatically controlling the operation of a work vehicle, such as an agricultural vehicle, a construction vehicle, or a forestry vehicle.

BACKGROUND OF THE INVENTION

Traditionally, the operator of a work vehicle, such as an agricultural, construction, or forestry vehicle, has been required to continuously monitor various operating parameters during operation of the vehicle. Based on these operating parameters, the operator must then keep various vehicle settings at optimum levels to maintain the quality of the operation being performed by the work vehicle. However, the operator has a finite capacity to effectively monitor vehicle operating parameters and adjust vehicle settings accordingly. Moreover, inexperienced vehicle operators may find such monitoring and adjusting to be particularly challenging and taxing. Thus, the quality of the operation being performed can vary greatly depending on operator experience, fatigue, and/or the like. In this respect, systems for automatically controlling work vehicle operation have been developed. While such systems work well, further improvements are needed.

Accordingly, an improved method and system for controlling work vehicle operation would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for automatically controlling work vehicle operation. The system includes a work vehicle having a plurality of subsystems. Furthermore, the system includes a remote computing system located remote from the work vehicle. In this respect, the remote computing system is configured to receive a first input indicative of a plurality of conditions present at a plurality of locations within a field or a work site. Additionally, the remote computing system is configured to receive a second input indicative of a plurality of operational capability parameters and one or more transfer functions associated with the work vehicle. Moreover, the remote computing system is configured to determine a plurality of settings for the work vehicle and a plurality of expected outcomes at each of the plurality of locations based on the plurality of conditions present at the corresponding location of the plurality of locations, the plurality of operational capability parameters, and the one or more transfer functions, with each setting being associated with an operation of one or more of the plurality of subsystems. In addition, the remote computing system is configured to generate a map identifying the plurality of settings and the plurality of expected outcome at each of the plurality of locations for each of the plurality of subsystems. Furthermore, the system includes an onboard computing system located on the work vehicle. As such, the onboard computing system configured to control an operation of the work vehicle based on the generated map as the work vehicle traverses the field or the work site. Additionally, the onboard computing system is configured to determine a plurality of actual outcomes at each of the plurality of locations as the work vehicle traverses the field or the work site. Moreover, the onboard computing system is configured to compare the plurality of actual outcomes and the plurality of expected outcomes at each of the plurality of locations. In addition, the onboard computing system is configured to apply one or more offsets to the plurality of settings when the plurality of actual outcomes differs from the plurality of expected outcomes by more than a threshold amount.

In another aspect, the present subject matter is directed to a system for automatically controlling work vehicle operation. The system includes a work vehicle having a plurality of subsystems. Furthermore, the system includes a remote computing system located remote from the work vehicle. In this respect, the remote computing system is configured to receive a first input indicative of a plurality of conditions present at a plurality of locations within a field or a work site. Additionally, the remote computing system is configured to receive a second input indicative of a plurality of operational capability parameters and one or more transfer functions associated with the work vehicle. Moreover, the remote computing system is configured to determine a plurality of settings for the work vehicle at each of the plurality of locations based on the plurality of conditions present at the corresponding location of the plurality of locations, the plurality of operational capability parameters, and the one or more transfer functions, with each setting being associated with an operation of one or more of the plurality of subsystems. In addition, the remote computing system is configured to generate a map identifying the plurality of settings and the plurality of expected outcomes at each of the plurality of locations. Furthermore, the system includes an onboard computing system located on the work vehicle. As such, the onboard computing system is configured to control an operation of the work vehicle based on the generated map as the work vehicle traverses the field or the work site. Additionally, the onboard computing system is configured to determine a plurality of actual outcomes at each of the plurality of locations at each of the plurality of locations as the work vehicle traverses the field or the work site. Moreover, the onboard computing system is configured to control a ground speed of the work vehicle based on the plurality of actual outcomes at each of the plurality of locations.

In a further aspect, the present subject matter is directed to a method for automatically controlling work vehicle operation. The method includes receiving, with an onboard computing system located on a work vehicle, a map from a remote computing system that is located remote from the work vehicle. The map, in turn, identifies a plurality of settings for the work vehicle and a plurality of expected outcomes at each of a plurality of locations within a field or a work site based on a plurality of conditions present at the corresponding location of the plurality of locations and a plurality of operational capability parameters and one or more transfer functions associated with the work vehicle, with each setting of the plurality of settings being associated with an operation of at least one of a plurality of subsystems of the work vehicle. Furthermore, the method includes controlling, with the onboard computing system, an operation of the work vehicle based on the received map as the work vehicle traverses the field or the work site. Additionally, the method includes determining, with the onboard computing system, a plurality of actual outcomes at each of the plurality of locations as the work vehicle traverses the field or the work site for each of the plurality of subsystems. Moreover, the method includes comparing, with the onboard computing system, the plurality of actual outcomes and the plurality of expected outcomes at each of the plurality of locations for each of the plurality of subsystems. In addition, the method includes applying, with the onboard computing system, one or more offsets to the plurality of settings when the plurality of actual outcomes differs from the plurality of expected outcomes by more than a threshold amount.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
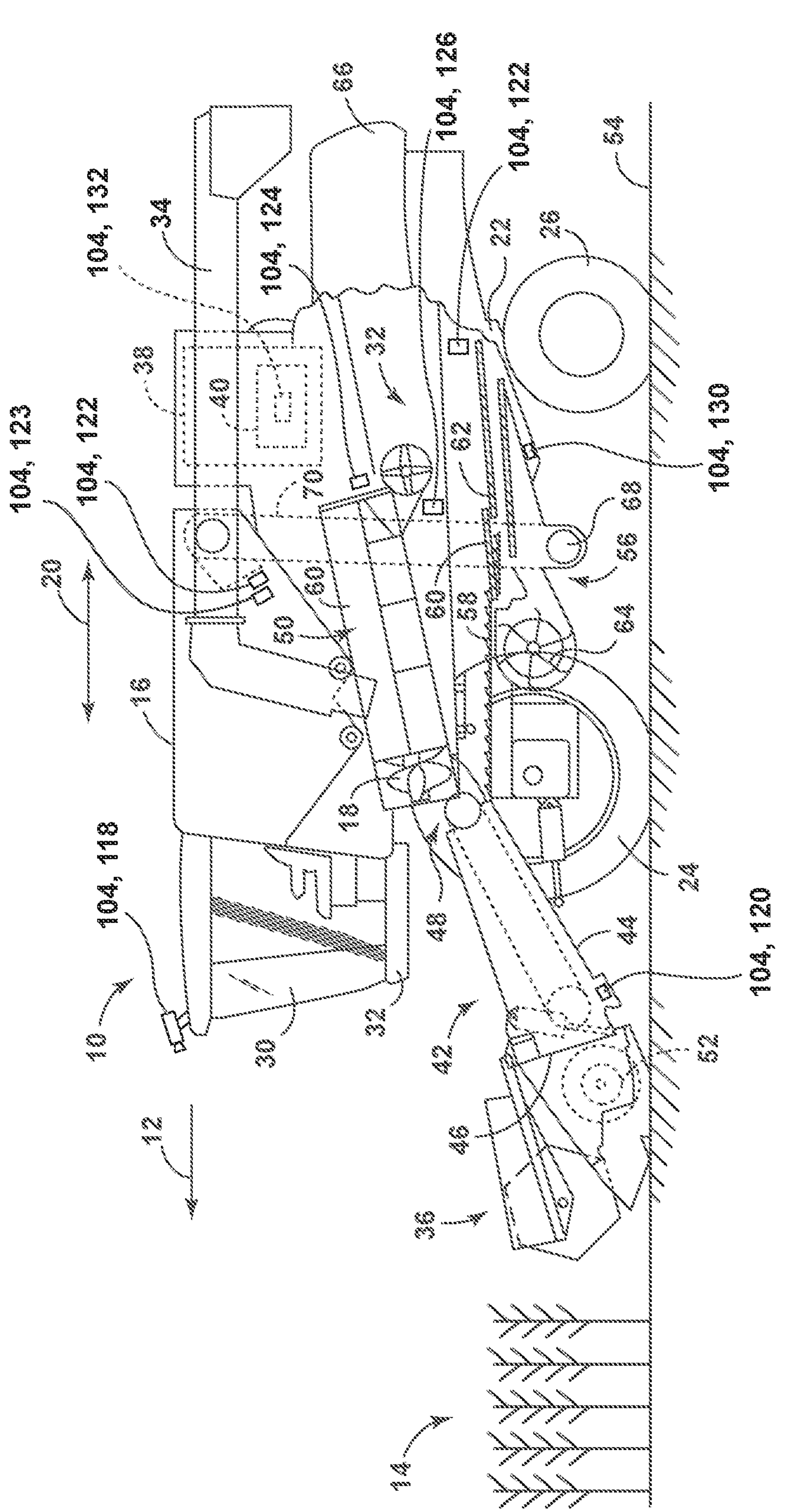
FIG. 1 illustrates a partial sectional side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for automatically controlling work vehicle operation. Specifically, in several embodiments, a remote computing system is configured to receive a first input indicative of a plurality of conditions present at a plurality of locations within a field or a work site. For example, the first input may include topographical data, soil type data, weather data, planting data, harvesting data, image data depicting plants within the field, and/or the like. Furthermore, the remote computing system is configured to a second input indicative of a plurality of operational capability parameters and one or more transfer functions associated with a work vehicle. Additionally, the remote computing system is configured to determine a plurality of settings for the work vehicle and a plurality of expected outcomes at each location based on the conditions present at that location, the operational capability parameters, and the transfer function(s). Each setting is, in turn, associated with the operation of one or more of the subsystems of the work vehicle. Moreover, each expected outcome is a parameter associated with the expected operation of the work vehicle, or one or more vehicle subsystems, during the upcoming task. In addition, the remote computing system is configured to generate a map identifying the settings for the work vehicle and the expected outcomes at each location within the field/work site for each of the vehicle subsystems. The map may then be stored (e.g., in a data repository) for subsequent use by the work vehicle.

Furthermore, in several embodiments, an onboard computing system is configured to control the operation of the work vehicle based on the generated map. For example, the map may be transmitted from the remote computing system to the onboard computing system prior to operation of the work vehicle. In this respect, as the work vehicle traverses the field/work site, the onboard computing system is configured to control the operation of the subsystems of the vehicle based on the settings identified in the map for each field/work site location of the vehicle. Furthermore, the onboard computing system is configured to determine a plurality of actual outcomes at each location the work vehicle traverses the field/work site. Thereafter, when the actual and expected outcomes differ by more than a threshold amount, the onboard computing system may apply one or more offsets to the settings provided by the map.

Moreover, the onboard computing system may be configured to determine the ground speed for the work vehicle at each location based on the actual outcomes. Specifically, in several embodiments, the ground speed may be based on the actual engine load being placed on the vehicle. In such embodiments, the ground speed may be set such that the actual engine load on the vehicle corresponds to the maximum threshold engine capacity. The maximum threshold engine capacity may, in turn, be less than (e.g., ninety percent of) the maximum engine capacity. Thus, the ground speed of the vehicle at each location is set such that the combination of the load placed on the engine by propelling the vehicle at that ground speed and the load placed on the engine by the operation of the vehicle subsystems corresponds to the maximum threshold engine load. However, in other embodiments, the ground speed for the work vehicle at each location based on other actual outcomes and/or a combination of actual outcomes.

The disclosed systems and methods improve the operational efficiency of the work vehicle. More specifically, as described above, with the disclosed systems and methods, a map identifying settings for the vehicle and expected outcomes associated with the operation of the work vehicle during the upcoming task is generated by the remote computing system. Thereafter, the map is transmitted to the onboard computing system of the work vehicle and used to initially control operation of the vehicle during the operation. When actual outcomes during the task differ from the expected outcomes by more than a threshold amount, one or more offsets may be applied to the settings in the map. As such, the disclosed systems and methods minimize the computational load on the onboard computing system and communications bandwidth needed during task execution, while still allowing the work vehicle to adapt to unexpected conditions present within the field/work site.

Referring now to the drawings, FIG. 1 illustrates a partial sectional side view of one embodiment of a work vehicle 10 in accordance with aspects of the present subject matter. In the illustrated embodiment, the work vehicle 10 is configured as an agricultural vehicle and, more specifically, as an agricultural harvester. In such an embodiment, the work vehicle 10 is configured to travel across a field in a forward direction of travel (indicated by arrow 12) to harvest a standing crop 14 present within the field. While traversing the field, the work vehicle 10 is configured to process the harvested material and store the grain, seed, or the like within a crop tank 16 of the work vehicle 10. However, in other embodiments, the work vehicle 10 may be configured as any other suitable type of agricultural vehicle (e.g., an agricultural tractor with a task-dependent implement, sprayer, etc.), a suitable construction vehicle (e.g., a motor grader, dozer, tractor-loader-backhoe, skid steer loader, etc.), or a forestry vehicle (e.g. a feller-buncher, log skidder, cut-to-length tree harvester, forwarder, tree planter, etc.).

Furthermore, in the illustrated embodiment, the work vehicle 10 is configured as an axial-flow type combine in which the harvested crop material is threshed and separated while being advanced by and along a rotor 18 extending in an axial direction 20. However, in alternative embodiments, the work vehicle 10 may have any other suitable harvester configuration, such as a traverse-flow type configuration in which the rotor extends in a lateral direction.

The work vehicle 10 includes a chassis or frame 22 configured to support and/or couple to various components of the work vehicle 10. For example, in several embodiments, the work vehicle 10 may include a pair of driven, front wheels 24 and a pair of steerable, rear wheels 26 coupled to the chassis 22. As such, the wheels 24, 26 may be configured to support the work vehicle 10 relative to the ground and move the work vehicle 10 in the forward direction of travel 12. However, in alternative embodiments, the work vehicle 10 may include any other suitable types of traction devices configured to support the vehicle 10 relative to and move the vehicle 10 across the field, such as one or more pairs of track assemblies (not shown).

Furthermore, the work vehicle 10 may include an operator's platform 28 having an operator's cab 30, a crop processing system 32, the crop tank 16, and a crop unloading tube 34 supported by the chassis 22. As will be described below, the crop processing system 32 may be configured to perform various processing operations on the harvested material as the crop processing system 32 transfers the harvested material from a harvesting implement 36 (e.g., a header) of the work vehicle 10 and through the work vehicle 10.

Moreover, the work vehicle 10 may include an engine 38 and a transmission 40 mounted on the chassis 22. The transmission 40 may be operably coupled to the engine 38 and may provide variably adjusted gear ratios for transferring engine power to the wheels 24 via a drive axle assembly (or via axles if multiple drive axles are employed).

Additionally, as shown in FIG. 1, the work vehicle 10 includes a feeder 42 that couples to and supports the harvesting implement 36. More specifically, the feeder 42 may include a feeder housing 44 extending from a forward end 46 to an aft end 48. The forward end 46 of the feeder housing 44 may, in turn, be coupled to harvesting implement 36. Moreover, the aft end 48 of the feeder housing 44 may be pivotably coupled to the chassis 22 adjacent to a threshing and separating assembly 50 of the crop processing system 32. Such a pivotable coupling may permit movement of the harvesting implement 36 relative to the field surface in the vertical direction.

As the work vehicle 10 is propelled in the forward direction of travel 12 over the field with the standing crop 14, the material is severed from the stubble by a cutter bar (not shown) positioned at the front of the harvesting implement 36. The harvested material is delivered by a header conveyance device 52 (e.g., an auger, belt, chain, etc.) to the forward end 46 of the feeder housing 44, which supplies the harvested crop material to the threshing and separating assembly 50. In general, the threshing and separating assembly 50 may include a cylindrical chamber 54 in which the rotor 18 is rotated to thresh and separate the harvested material received therein. That is, the harvested material is rubbed and beaten between the rotor 18 and the inner surfaces of the chamber 54 to loosen and separate the grain, seed, or the like from the straw.

The material separated by the threshing and separating assembly 50 may fall onto a cleaning assembly 56 of the crop processing system 32. As will be described below, the cleaning assembly 56 may include a series of oscillating components, such as one or more pans 58, pre-sieves 60, and/or sieves 62, that are configured to oscillate relative to the frame 22. As such, the separated material may be spread out via the oscillation of such components 58, 60, 62 and the grain, seeds, or the like may eventually fall through apertures defined by the sieve(s) 62. Additionally, a cleaning fan 64 may be positioned adjacent to one or more of the pre-sieve(s) 60 and the sieve(s) 62 to provide an air flow through that removes chaff and other impurities from the material present thereon. The impurities may be discharged from the work vehicle 10 through the outlet of a straw hood 66 positioned at the aft end of the work vehicle 10. The cleaned harvested crop passing through the sieve(s) 62 may then fall into a trough of an auger 68, which may transfer the harvested crop to an elevator 70 for delivery to the crop tank 16.

Additionally, the work vehicle 10 includes one or more outcome sensors 104 supported thereon. In general, each outcome sensor 104 generates data indicative of an outcome associated with the operation or task being performed by the work vehicle 10. As used herein, an "outcome" is any parameter of the vehicle 10 or the field/work site that is associated with the operation or the task being performed by the vehicle 10. In this respect, and as will be described below, the data generated by the outcome sensor(s) 104 is used to control the operation of the work vehicle 10.

As described above, in several embodiments, the work vehicle 10 is configured as an agricultural harvester. In such embodiments, the outcome sensor(s) 104 is configured to generate data indicative of one or more outcomes associated with the harvesting operation being performed. For example, the outcome sensor(s) 104 may include one or more field biomass sensors 118 (e.g., a camera(s), a LiDAR sensor(s), a RADAR sensor(s) having a field(s) of view directed in front of the vehicle 10) configured to generate data indicative of the amount of biomass present within the field in front of the work vehicle 10. Moreover, the outcome sensor (s) 104 may include one or more biomass flow sensors 120 (e.g., a load cell(s) positioned within the feeder 42) configured to generate data indicative of the amount of biomass being ingested by the vehicle 10. In addition, the outcome sensor(s) 104 may include one or more grain yield sensors 122 (e.g., a load cell(s) associated with the elevator 70 and/or the tank 16) configured to generate data indicative of the amount of grain being collected by the vehicle 10. Moreover, the outcome sensor(s) 104 may include one or more grain quality sensors 123 (e.g., a moisture sensor, protein sensor, oil sensor, camera with or without wavelength filters and image analysis system, etc.) configured to generate data indicative of the quality level of the harvested grain and/or potential damage to the harvested grain by the various processing systems of the vehicle 10. Furthermore, the outcome sensor(s) 104 may include one or more rotor load sensors 124 (e.g., a load cell(s) associated with the rotor 18) configured to generate data indicative of the load being placed on the rotor 18 by the threshing of the ingested crop material. Additionally, the outcome sensor(s) 104 may include one or more rotor grain loss sensors 126 configured to generate data indicative of the amount of grain being lost during processing of the ingested crop material by the rotor 18. Moreover, the outcome sensor(s) 104 may include one or more shoe grain loss sensors 128 configured to generate data indicative of the amount of grain being lost during processing of the ingested crop material by a shoe (not shown) of the vehicle 10. In addition, the outcome sensor(s) 104 may include one or more re-threshing rate sensors 130 configured to generate data indicative of the amount of or rate at which the grain is being re-threshed.

However, in alternative embodiments, the outcome sensor(s) 104 may be configured as any other suitable type(s) of sensor(s) or sensing device(s) configured to generate data associated with the operation of the work vehicle 10. For example, in some embodiments, the outcome sensor(s) 104 may include one or more engine load sensors 132 configured to generate data indicative of the actual engine load being placed on the engine 38 of the work vehicle 10. In such embodiments, the outcome sensor(s) 104 may include an engine speed sensor, a throttle position sensor, an air flow sensor, a fuel flow sensor, and/or the like. Additionally, or an alternative, the outcome sensor(s) 104 may include one or more a force/torque sensor(s) (not shown) (e.g., to generate data indicative of the force/torques being applied to tools associated with the vehicle 10), a flow sensor(s) (not shown) (e.g., to generate data indicative of the flow rate and/or pressure of hydraulic fluid), an electrical measuring device(s) (not shown) (e.g., to generate data indicative of electrical current draw and/or voltage drop for one or a plurality of electrical sub-systems), a pneumatic measuring device(s) (not shown) (e.g., to generate data indicative of pressures and/or flow rate of air), a soil moisture sensor(s) (not shown), a tire imprint depth sensor (not shown) (e.g. s RADAR, LIDAR, or camera with image analysis capability to generate data indicative of the height difference between, within, and/or outside of the wheel path(s)), and/or the like.

The configuration of the work vehicle 10 described above and shown in FIG. 1 is provided only to place the present subject matter in an exemplary field of use. Thus, the present subject matter may be readily adaptable to any manner of work vehicle configuration.

Figure 2:
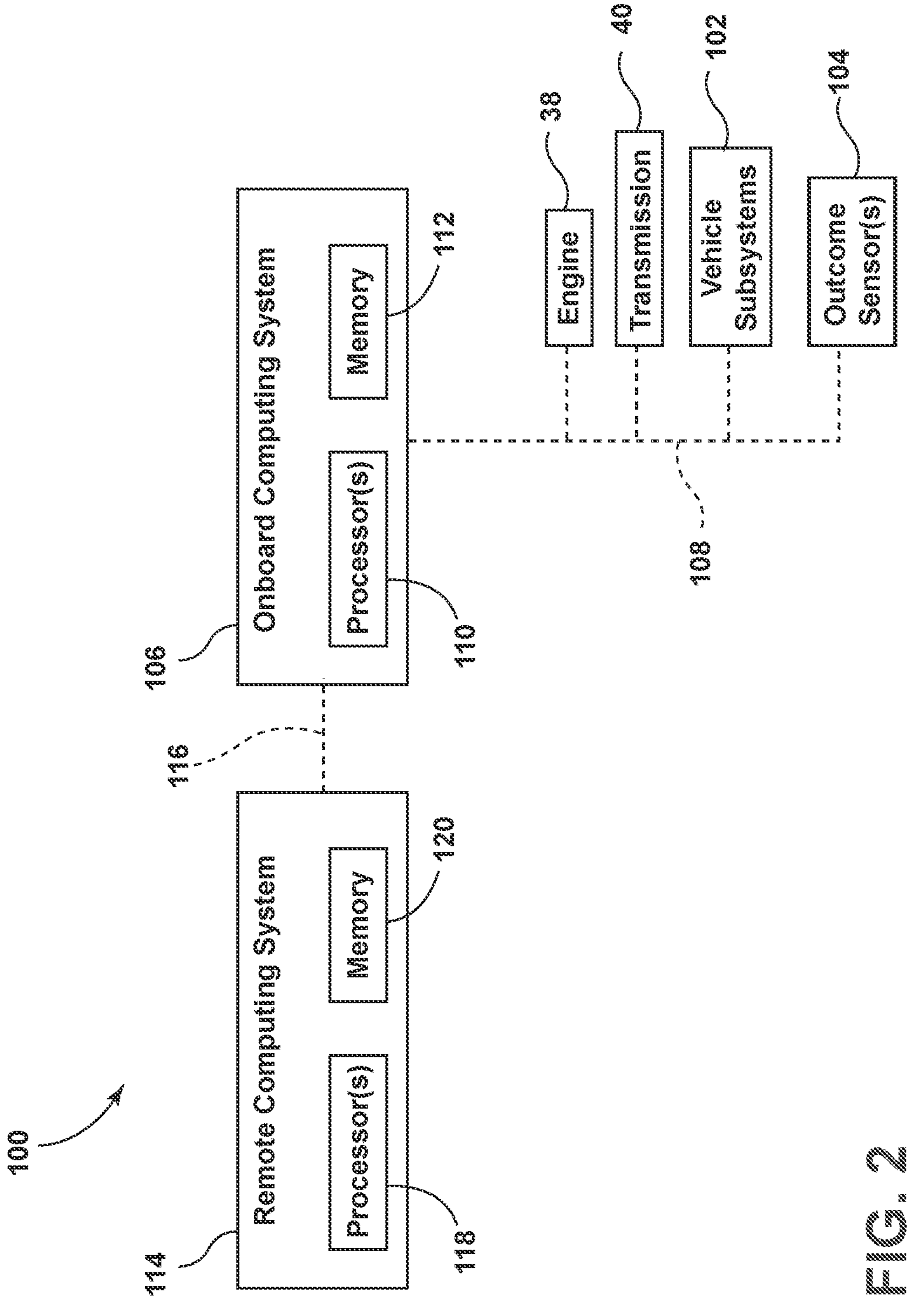
FIG. 2 illustrates a schematic view of one embodiment of a system for automatically controlling work vehicle operation in accordance with aspects of the present subject matter.

Referring now to FIG. 2, a schematic view of one embodiment of a system 100 for automatically controlling work vehicle operation is illustrated in accordance with aspects of the present subject matter. In general, the system 100 will be described herein with reference to the work vehicle 10 described above with reference to FIG. 1. However, it should be appreciated by those of ordinary skill in the art that the disclosed system 100 may generally be utilized with work vehicles having any other suitable vehicle configuration.

As shown in FIG. 2, the system 100 may include a plurality of subsystems 102 of the work vehicle 10. In general, the subsystems 102 are components and/or systems of the work vehicle 10 that do not propel the work vehicle 10 across the field/work site in the direction of travel 12. For example, in embodiments in which the work vehicle 10 is configured as an agricultural harvester (e.g., as shown in FIG. 1), the subsystems 102 may include the crop unloading tube 34, the harvesting implement 36, the threshing and separating assembly 50, the cleaning assembly 56, the elevator 70, and/or the like. In embodiments in which the work vehicle 10 is configured as an agricultural sprayer, the subsystems 102 may include the spraying system, the rinsing system, the purging system, the hydraulic system (e.g., for boom adjustment), and/or the like. Moreover, in embodiments in which the work vehicle 10 is configured as an agricultural tractor with a task-dependent implement (e.g., a tillage implement, a planting implement, etc.), a construction vehicle, or forestry vehicle, the subsystems 102 may include the hydraulic system (e.g., for implement control, blade/bucket control, etc.) and/or the like. However, in alternative embodiments, the subsystems 102 may include any other non-powertrain components or systems of the work vehicle 10.

Additionally, the system 100 includes an onboard computing system 106 located on or otherwise supported on the work vehicle 10. In this respect, the onboard computing system 106 is communicatively coupled to one or more components of the work vehicle 10 and/or the system 100 to allow the operation of such components to be electronically or automatically controlled by the onboard computing system 106. For instance, the onboard computing system 106 may be communicatively coupled to the engine 38, the transmission 40, and the vehicle subsystems 102 via a communicative link 108. In this respect, and as will be described below, the onboard computing system 106 may be configured to control the operation of the engine 38, the transmission 40, and the vehicle subsystems 102 such that the vehicle 10 traverses a field or a work site to perform an operation thereon. Furthermore, the onboard computing system 106 may be communicatively coupled to the outcome sensor(s) 104 via the communicative link 108. As such, the onboard computing system 106 may be configured to receive data from the outcome sensor(s) 104 that is indicative of the actual outcomes associated with the operation or task being performed by the work vehicle 10. In addition, the onboard computing system 106 may be communicatively coupled to any other suitable components of the work vehicle 10 and/or the system 100.

In general, the onboard computing system 106 may comprise one or more processor-based devices, such as a given controller or computing device or any suitable combination of controllers or computing devices. Thus, in several embodiments, the onboard computing system 106 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 112 of the onboard computing system 106 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 112 may generally be configured to store suitable computer-readable instructions that, when implemented by the processor(s) 110, configure the onboard computing system 106 to perform various computer-implemented functions, such as one or more aspects of the methods and algorithms that will be described herein. In addition, the onboard computing system 106 may also include various other suitable components, such as a communications circuit or module, one or more input/output channels, a data/control bus and/or the like.

The various functions of the onboard computing system 106 may be performed by a single processor-based device located on the work vehicle 10 or may be distributed across any number of processor-based devices located on the work vehicle 10, in which instance such devices may be considered to form part of the onboard computing system 106. For example, in several embodiments, the functions of the onboard computing system 106 may be distributed across one or more controllers or computing devices of the work vehicle 10, such as a navigation controller, an engine controller, a transmission controller, an implement controller, etc.

Moreover, the system 100 includes a remote computing system 114 located remote from or otherwise positioned at remote location relative to the work vehicle 10. In several embodiments, the remote computing system 114 may be selectively communicatively coupled to one or more components of the system 100. For example, in certain instances (e.g., prior to operation or after operation, but generally not during operation), the remote computing system 114 may be communicatively coupled to the onboard computing system 106 via a communicative link 116. In this respect, and as will be described below, the remote computing system 114 may be configured to transmit data (e.g., a map prescribing geo-referenced settings and expected outcomes for the vehicle subsystems 102) to the onboard computing system 106. Moreover, the onboard computing system 106 may be configured to transmit data (e.g., an as-executed map describing the actual geo-referenced settings and actual outcomes from the operation) to the remote computing system 114, which can inform future operations in the field/work site just worked and/or with the just used work vehicle in any field/work site going forward.

In general, the remote computing system 114 may comprise one or more processor-based devices, such as a given controller or computing device or any suitable combination of controllers or computing devices. Thus, in several embodiments, the remote computing system 114 may include one or more processor(s) 118 and associated memory device(s) 120 configured to perform a variety of computer-implemented functions. Such memory device(s) 120 may generally be configured to store suitable computer-readable instructions that, when implemented by the processor(s) 116, configure the remote computing system 114 to perform various computer-implemented functions, such as one or more aspects of the methods and algorithms that will be described herein. In addition, the remote computing system 114 may also include various other suitable components, such as a communications circuit or module, one or more input/output channels, a data/control bus and/or the like.

The various functions of the remote computing system 114 may be performed by a single processor-based device positioned at a location remote from the work vehicle 10 or may be distributed across any number of processor-based devices positioned at locations remote from the work vehicle 10, in which instance such devices may be considered to form part of the remote computing system 114. For example, in several embodiments, the functions of the remote computing system 114 may be distributed across one or more controllers or computing devices that are remote from the work vehicle 10, such as a laptop(s), a tablet(s), a Smartphone(s), a cloud-based server(s), etc.

Additionally, the communicative links 108, 116 may operate under a plurality of communications protocols. For example, in some embodiments, the communicative link 108 coupling the onboard computing system 106 and the vehicle components 38, 40, 102, 104 may operate under one communications protocol (e.g., CANBUS, ISOBUS, Ethernet, etc.), while the communicative link 116 coupling the onboard computing system 106 and the remote computing system 114 may operate under another communications protocol (e.g., 3G, 4G, LTE, Wi-Fi, etc.).

Figure 3:
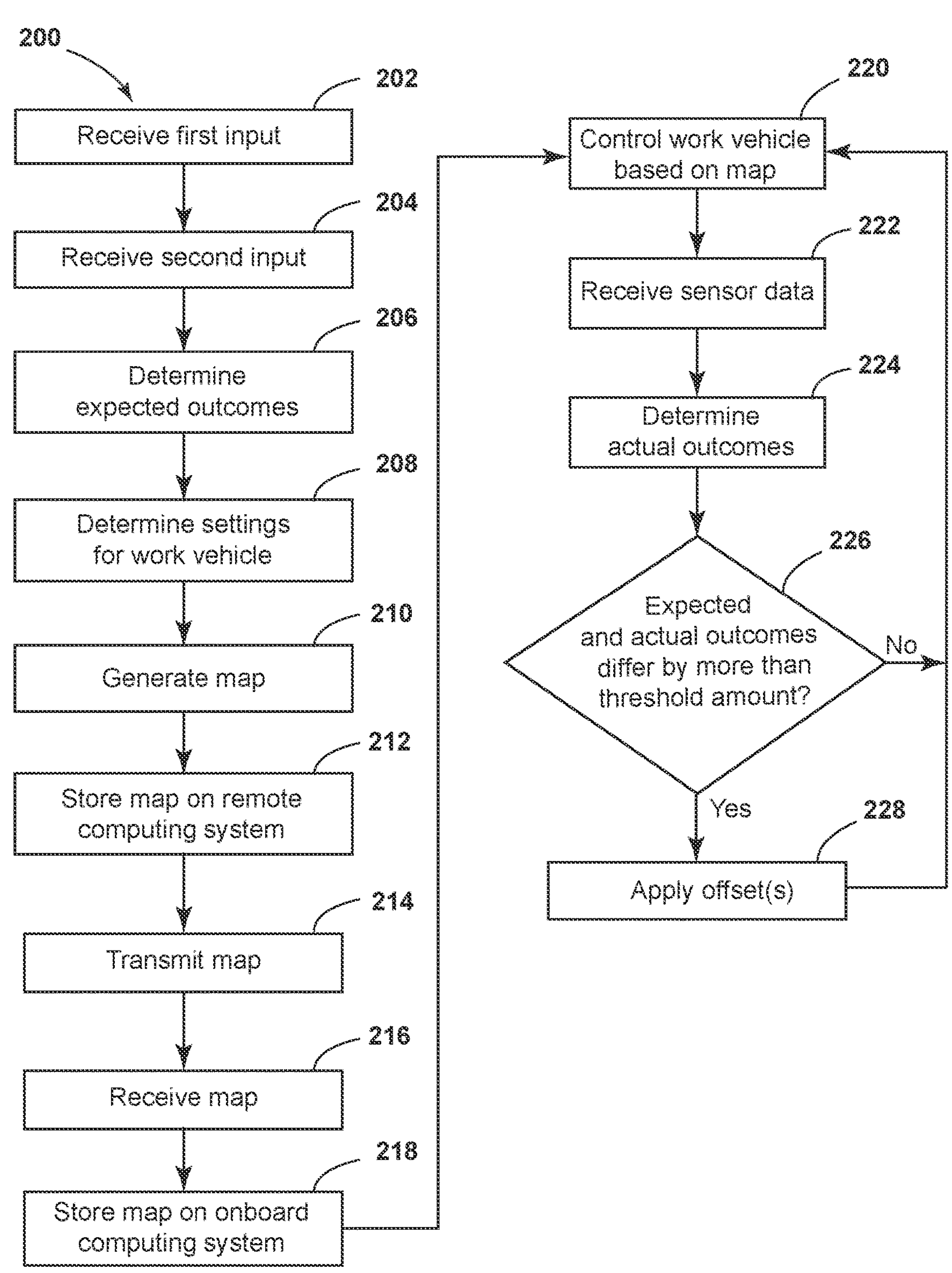
FIG. 3 illustrates a flow diagram providing one embodiment of control logic for automatically controlling work vehicle operation in accordance with aspects of the present subject matter.

Referring now to FIG. 3, a flow diagram of one embodiment of example control logic 200 that may be executed by a combination of the onboard computing system 106 and the remote computing system 114 (or any other suitable computing system(s)) for automatically controlling work vehicle operation is illustrated in accordance with aspects of the present subject matter. Specifically, the control logic 200 shown in FIG. 3 is representative of steps of one embodiment of an algorithm that can be executed to automatically control work vehicle operation in a manner that minimizes the computational load on the onboard computing system and communications bandwidth needed during task execution, while still allowing the work vehicle to adapt to unexpected conditions present within the field/work site. Thus, in several embodiments, the control logic 200 may be advantageously utilized in association with a system installed on or forming part of a work vehicle to allow for real-time automatically control of work vehicle operation without requiring substantial computing resources and/or processing time. However, in other embodiments, the control logic 200 may be used in association with any other suitable system, application, and/or the like for automatically controlling work vehicle operation.

As shown, at (202), the control logic 200 includes receiving a first input indicative of a plurality of conditions present at a plurality of locations within a field or a work site. Specifically, in several embodiments, the remote computing system 114 may be configured to receive a first input indicative of a plurality of conditions present at a plurality of locations within a field or a work site. As will be described below; the first input received at (202) is used (in combination with data indicative of vehicle capabilities) to determine expected outcomes for a subsequent operation and settings for the various subsystems 102 of the work vehicle 10 to be used at each location within a field or work site during the subsequent operation. Thus, the first input generally corresponds to data that is collected before the operation is performed.

The first input may correspond to any suitable data or collection of data that this indicative of the expected conditions of the field or work site. For example, the first input may include topographical data (e.g., a topographical map of the field/work site), soil type data (e.g., a soil type map of the field/work site), and/or weather data (e.g., weather forecast data, precipitation data, temperature data, humidity data, cloud cover data, etc.). Additionally, or as an alternative, the first input may include planting data (e.g., a map depicting seed type and/or planting locations within the field) and/or harvesting data (e.g., a map depicting biomass within the field). Additionally, or as an alternative, the first input may include image data (e.g., RGB images, NIR images, etc.) depicting the plants (e.g., crops and/or weeds) present within the field at one or more times during the growing cycle. However, in alternative embodiments, the first input may include any other type of data indicative of the expected conditions of the field/work site that can be used to determine settings for the various subsystems 102 of the work vehicle 10.

Furthermore, at (204), the control logic 200 includes receiving a second input indicative of a plurality of operational capability parameters and one or more transfer functions associated with a work vehicle. Specifically, in several embodiments, the remote computing system 114 may be configured to receive a second input indicative of a plurality of operational capability parameters and one or more transfer functions associated with the work vehicle 10. As will be described below, the second input received at (204) is used in combination with the first input received at (202) to determine expected outcomes for the subsequent operation and settings for the various subsystems 102 of the work vehicle 10 to be used at each location within the field or work site during the subsequent operation.

The second input may correspond to any suitable data or collection of data that this indicative of the operational capabilities and one or more transfer functions associated work vehicle 10. In general, the second input is indicative of the settings of each subsystem 102 and transfer(s) functions that are necessary for the subsystem 102 to adequately perform its operation in different conditions. The transfer functions(s) may, in turn, be determined experimentally and/or empirically. For example, in an embodiment in which the work vehicle 10 is configured as an agricultural harvester, the second input may include the rotational speeds at which the header auger 52, the rotor 18, the cleaning fans 64, and/or the like must rotate to ingest and process varying levels of crops (e.g., biomass) present within the field. In embodiments in which the work vehicle 10 is configured as an agricultural sprayer, the second input may include the speeds at which the pumps of spraying system must operate to dispense sufficient agricultural fluids (e.g., pesticides, nutrients, etc.) based on the crop health, weed coverage, soil nutrient content, and/or the like within the field. Moreover, in embodiments in which the work vehicle 10 is configured as an agricultural tractor with task-dependent implement, a construction vehicle, or forestry vehicle, the second input may include the speeds of which the pumps of the hydraulic system must operate to generate various flow rates and/or pressures of hydraulic fluid (e.g., for implement control, blade/blade control, etc.). However, in alternative embodiments, the second input may include any other data that is indicative of how the subsystems 102 of the work vehicle 10 need to operate under a given set of field/work site conditions.

The remote computing system 114 may receive the first input at (202) and/or the second input at (204) in any suitable manner. For example, in some embodiments, the first and second inputs may be transmitted to the remote computing system 114 from one or more other computing systems (not shown). In other embodiments, the remote computing system 114 may receive the first input from one or more sensors, such as one or more sensors associated with a remote weather station or one or more soil moisture sensors installed in the soil profile at known locations in the field/work site. In further embodiments, the remote computing system 114 may be pre-programmed with the second input stored within its memory device(s) 120.

Additionally, at (206), the control logic 200 includes determining a plurality of expected outcomes at each location within the field/work site for each subsystem of the work vehicle based on the conditions present at that location and the operational capability parameters and transfer function(s) associated with the vehicle. Specifically, in several embodiments, the remote computing system 114 is configured to determine a plurality of expected outcomes associated with the subsequent operation at each location within the field/work site for each of the subsystems 102 based on the expected conditions present at that location (e.g., based on the first input received at (202)) and the operational capability parameters and transfer function(s) associated with the vehicle 10 (e.g., based on the second input received at (204)). An expected outcome is, in turn, the expected value of a parameter associated with the subsequent operation to be performed by the vehicle 10, such as a vehicle parameter or a field parameter. In one embodiment, the remote computing system 114 may include a set of look-up tables and/or a transfer function(s) stored within its memory device(s) 120 that correlates the expected conditions of the field/work site and the operational capability parameters associated with vehicle 10 to the expected outcomes. In this respect, and as will be described below, the expected outcomes determined at (206) by the remote computing system 114 will be used to by the onboard computing system 106 to control the operation of the subsystems 102 as the vehicle 10 travels across the field/work site to perform the operation thereon.

As mentioned above, in some embodiments, the work vehicle 10 may be configured as an agricultural harvester. In such embodiments, the expected outcomes may include the expected amount of biomass present within the field forward of the vehicle 10, the expected amount of or rate at which biomass is being ingested by the vehicle 10, the expected grain yield, the expected grain quality, the expected rotor load of the vehicle 10, the expected rotor grain loss of the vehicle 10, the expected shoe grain loss of the vehicle 10, the expected re-threshing rate of the vehicle 10, and/or the like. For example, in one embodiment, the remote computing system 114 may determine the expected crop biomass at each location within the field based on the first input received at (202). For example, the remote computing system 114 may input topographical data, weather data, soil type data, planting data, and/or the like into one or more models or algorithms to determine the expected biomass at each location within the field. Additionally, the expected outcomes may include the expected engine load on the engine 38. Other expected outcomes may be determined in a similar manner.

Moreover, as mentioned above, the work vehicle 10 may be configured as another type of agricultural vehicle, a construction vehicle, or a forestry vehicle. Additional examples of determining the expected outcomes for operations to be performed by such embodiments of the work vehicle 10 at (206) are omitted for brevity. However, a person of ordinary skill in the art would appreciate that the expected outcomes for operations to be performed by such embodiments of the work vehicle 10 can be determined at (206) in accordance with the intended operation of such vehicles.

Additionally, at (208), the control logic 200 includes determining a plurality of settings for the work vehicle at each location within the field/work site based on the conditions present at that location and the operational capability parameters and transfer function(s) associated with the work vehicle. Specifically, in several embodiments, the remote computing system 114 is configured to determine a plurality of settings for the work vehicle 10 at each location within the field/work site based on the expected conditions present at that location (e.g., based on the first input received at (202)) and the operational capability parameters and the transfer function(s) associated with the vehicle 10 (e.g., based on the second input received at (204)). For example, the remote computing system 114 may include a set of look-up tables or a transfer function(s) stored within its memory device(s) 120 that correlates the expected conditions of the field/work site and the operational capability parameters of vehicle 10 to the settings. Each setting determined at (208) is, in turn, associated with the operation of at least one of the subsystems 102 of the work vehicle 10. In this respect, and as will be described below, the settings determined at (208) by the remote computing system 114 will be used to by the onboard computing system 106 to control the operation of the subsystems 102 as the vehicle 10 travels across the field/work site to perform the operation thereon.

As mentioned above, in some embodiments, the work vehicle 10 may be configured as an agricultural harvester. In such embodiments, the remote computing system 114 uses the operational capability parameters and the transfer function(s) associated with the vehicle 10 received at (204) to determine settings for the various subsystems 102 of the vehicle 10 to be used at each location within the field such that the vehicle 10 can effectively harvest and process the expected biomass at the highest quality possible given the conditions at that location. Thus, in such embodiments, the settings determined at (208) may include rotational speeds for the header auger 52, the rotor 18, the cleaning fans 64, and/or the like to process the expected levels of crops at each location within the field. In addition, the settings determined at (208) may include navigational settings for the work vehicle 10, such as the heading or trajectory of the vehicle 10. Furthermore, for vehicles equipped with pneumatic tires, settings for inflation pressures for a particular location dependent on expected soil conditions and expected vehicle axle loading may be determined at (208) such that soil compaction risk is minimized.

Moreover, as mentioned above, the work vehicle 10 may be configured as another type of agricultural vehicle, a construction vehicle, or a forestry vehicle. Additional examples of determining the settings for the subsystems of such embodiments of the work vehicle 10 at (208) are omitted for brevity. However, a person of ordinary skill in the art would appreciate that the settings for the subsystems of such embodiments of the work vehicle 10 can be determined at (208) in accordance with the intended operation of such vehicles.

As shown in FIG. 3, at (210), the control logic 200 includes generating a map identifying the expected outcomes and the settings for the work vehicle at each location within the field/work site. Specifically, in several embodiments, the remote computing system 114 may be configured to generate a map identifying the expected outcomes determined at (206) and the settings determined at (208) for each subsystem 102 for each location within the field/work site at which the work vehicle 10 is to perform a subsequent operation. As will be described below, the map generated at (210) is used by the onboard computing system 106 control the work vehicle 10 during operation. By generating the map (and performing the associated modeling, computations, data processing, etc.) with the remote computing system 114 as opposed to the onboard computing system 106, the computational load placed on the onboard computing system 106 is reduced. This, in turn, conserves the limited computing resources of the onboard computing system 106.

As used herein, a "map" may generally correspond to any suitable dataset that correlates data to various locations within a field. Thus, for example, a map may simply correspond to a data table that correlates the expected outcome(s) and the setting(s) of the work vehicle 10 to various locations within the field/work site. Alternatively, a map may correspond to a more complex data structure, such as a geospatial numerical model or algorithm that can be used to identify the expected outcome(s) and the setting(s) of the work vehicle 10 at different locations within the field/work site.

Furthermore, at (212), the control logic 200 includes storing the map for subsequent use. Specifically, in several embodiments, the remote computing system 114 may be configured to store the map generated at (210) for subsequent use by the onboard computing system 106. For example, in some embodiments, the remote computing system 114 may store the map in a data repository within its memory device(s) 120.

Additionally, at (214), the control logic 200 includes transmitting the map to an onboard computing system of the work vehicle. As described above, in certain instances, such as before performing an operation or task, the remote computing system 114 and the onboard computing system 106 may be communicatively coupled via the communicative link 116. In this respect, the remote computing system 114 may be configured to transmit the map stored at (212) to the onboard computing system 106.

Moreover, at (216), the control logic 200 includes receiving the map from the remote computing system. Specifically, in several embodiments, the onboard computing system 114 may be configured to receive the map stored at (212) from the remote computing system 114 via the communicative link 116. For example, such receipt may occur when the work vehicle 10 is at a staging or marshalling area prior to beginning the operation within the field/work site. Upon completion of the transmission at (214) and the receipt at (216), the communicative link 116 is generally severed. Thus, the communication link bandwidth need is reduced as no data communication between the onboard computing system 106 and the remote computing system 114 is needed once the map has been downloaded to the onboard computing system 106, thereby allowing for efficient execution of the intended operation.

In addition, at (218), the control logic 200 includes storing the map on the onboard computing system. Specifically, in several embodiments, the onboard computing system 106 may be configured to store the map received at (216) for use during the upcoming operation or task. For example, in some embodiments, the remote computing system 114 may store the map within its memory device(s) 112.

As shown in FIG. 3, at (220), the control logic 200 includes controlling the operation of the work vehicle based on the generated map. Specifically, in several embodiments, the onboard computing system 106 is configured to control the operation of the work vehicle 10 based on the map received at (216) during the performance of an operation or a task. For example, in some embodiments, the onboard computing system 106 may determine the current location of the work vehicle 10 within the field/work site, such as based on positional data (e.g., GNSS-based data). The onboard computing system 106 may then access the map received at (214) to determine the settings for the subsystems 102 of the vehicle 10 at the current location. Thereafter, the onboard computing system 106 may transmit suitable control signals to the subsystems 102 of the vehicle 10 via the communicative link 108. Such control signals, in turn, instruct the subsystems 102 to operate at the settings determined at (206) for the current location of the vehicle 10 within the field/work site.

Furthermore, at (222), the control logic 200 includes receiving sensor data indicative of a plurality of actual outcomes associated with the operation being performed by the work vehicle. Specifically, as mentioned above, in several embodiments, the onboard computing system 106 may be communicatively coupled to the outcome sensor(s) 104 via the communicative link 108. In this respect, as the work vehicle 10 travels across the field to perform the operation thereon, the onboard computing system 106 may receive data from the outcome sensor(s) 104. Such data is, in turn, the actual or detected outcomes associated with the operation being performed by the work vehicle 10 on the field/work site.

As shown in FIG. 3, at (224), the control logic 200 includes determining the actual outcomes at each location within the field/work site based on the received sensor data. Specifically, in several embodiments, the onboard computing system 106 is configured to analyze the sensor data received at (222) to determine the actual outcomes associated with the operation being performed by the work vehicle 10 on the field/work site.

For example, as mentioned above, in some embodiments, the work vehicle 10 may be configured as an agricultural harvester. In such embodiments, the actual outcomes may include the actual amount of biomass present within the field forward of the vehicle 10, the actual amount of or rate at which biomass is being ingested by the vehicle 10, the actual grain yield, the actual grain quality, the actual rotor load of the vehicle 10, the actual rotor grain loss of the vehicle 10, the actual shoe grain loss of the vehicle 10, the actual re-threshing rate of the vehicle 10, and/or the like. Additionally, the actual outcomes may include the actual engine load on the engine 38. Other actual outcomes may be determined in a similar manner.

Additionally, as mentioned above, the work vehicle 10 may be configured as another type of agricultural vehicle, a construction vehicle, or a forestry vehicle. Additional examples of determining the actual outcomes associated with the operation being performed by such embodiments of the work vehicle 10 at (224) based on the various other types of sensors are omitted for brevity. However, a person of ordinary skill in the art would appreciate that the actual outcomes associated with such embodiments of the work vehicle 10 can be determined at (224) in a similar manner based on the various different embodiments of the outcome sensor(s) 104.

Moreover, at (226), the control logic 200 includes comparing the actual outcomes to the expected outcomes. Specifically, in several embodiments, the onboard computing system 106 may be configured to compare each actual outcomes associated with the operation being performed by the work vehicle 10 for each location within the field/work site as determined at (224) to the corresponding expected outcome for the corresponding location as determined at (206) and indicated by the map received at (216). In this respect, when one or more of the actual outcomes differ from the corresponding expected outcome(s) by no more than a threshold amount for a given location, the actual conditions of the field/work site at the given location are similar to the expected conditions at the given location used to generate the map at (210). In such instances, no adjustments to the settings in the map are needed. Thus, in such instances, the control logic 200 returns to (220) and the work vehicle 10 proceeds to the next location within the field/work site. Conversely, when one or more of the actual outcomes differ from the corresponding expected outcome(s) by more than the threshold amount for a given location, the actual conditions of the field/work site at the given location differ from the expected conditions at the given location used to generate the map at (210). In such instances, the settings provided by the map need to be adjusted. Thus, in such instances the control logic 200 proceeds to (228).

In addition, at (228), the control logic 200 includes applying one or more offsets to the settings for the work vehicle. Specifically, in several embodiments, when it is determined at (226) that one or more of the actual outcomes differ from the corresponding expected outcome(s) by more than the threshold amount for a given location, the onboard computing system 106 applies one or more offsets to the settings for the subsystems 102 of the work vehicle 10 indicated by the received map. The offset(s), in turn, adjust to the settings for the subsystems 102 indicated in the map compensate for the differences between the actual conditions of the field and the expected conditions of the field. As such, in one embodiment, the onboard computing system 106 may determine the offset(s) based on the magnitude of the differences between the actual outcome(s) and the corresponding expected outcome(s). Moreover, in some embodiments, when one or more of the actual outcomes differ from the corresponding expected outcome(s) by more than the threshold amount for a given location, the offset(s) is applied at every location within the field/work site moving forward until a new offset(s) or no offset(s) is needed. Upon completion of (226), the control logic 200 returns to (220) and the work vehicle 10 proceeds to the next location within the field/work site.

In some embodiments, during the operation of the work vehicle 10, the onboard computing system 106 may generate an as-executed map identifying the actual outcomes and the actual settings (e.g., the settings as adjusted by the offset(s)) at each location within the field/work site. In such embodiments, after the completion of the operation task, the remote computing system 114 and the onboard computing system 106 may be communicatively coupled via the communicative link 116. Thereafter, the onboard computing system 106 may be configured to transmit the as-executed map to the remote computing system 114.

Figure 4:
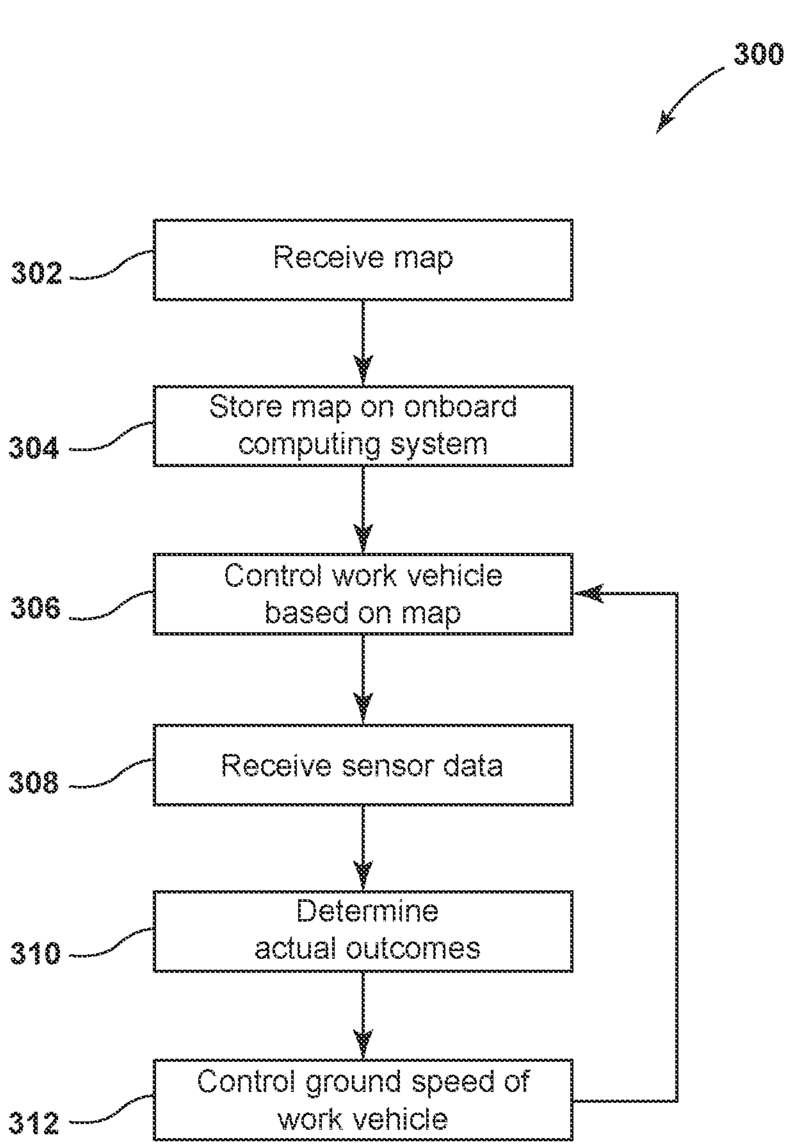
FIG. 4 illustrates a flow diagram providing another embodiment of control logic for automatically controlling work vehicle operation in accordance with aspects of the present subject matter.

Referring now to FIG. 4, a flow diagram of another embodiment of example control logic 300 that may be executed by the onboard computing system 106 (or any other suitable computing system(s)) for automatically controlling work vehicle operation is illustrated in accordance with aspects of the present subject matter. Specifically, the control logic 300 shown in FIG. 4 is representative of steps of one embodiment of an algorithm that can be executed to automatically control work vehicle operation in a manner that maximizes the work rate of the work vehicle at each location within the field, while still ensuring sufficient available engine capacity to operate the various subsystems of the work vehicle based on the expected conditions at each location. Thus, in several embodiments, the control logic 300 may be advantageously utilized in association with a system installed on or forming part of a work vehicle to allow for real-time automatically control of work vehicle operation without requiring substantial computing resources and/or processing time. However, in other embodiments, the control logic 300 may be used in association with any other suitable system, application, and/or the like for automatically controlling work vehicle operation.

As shown in FIG. 4, at (302), the control logic 300 includes receiving the map from the remote computing system. (302) is the same as or substantially similar to (216).

Furthermore, at (304), the control logic 300 includes storing the map on the onboard computing system. (304) is the same as or substantially similar to (218).

Additionally, at (306), the control logic 300 includes controlling the operation of the work vehicle based on the generated map. (306) is the same as or substantially similar to (220).

Moreover, at (308), the control logic 200 includes receiving sensor data indicative of a plurality of actual outcomes associated with the operation being performed by the work vehicle. Specifically, as mentioned above, in several embodiments, the onboard computing system 106 may be communicatively coupled to the outcome sensor(s) 104 via the communicative link 108. In this respect, as the work vehicle 10 travels across the field to perform the operation thereon, the onboard computing system 106 may receive data from the outcome sensor(s) 104. Such data is, in turn, the actual or detected outcomes associated with the operation being performed by the work vehicle 10 on the field/work site.

In addition, at (310), the control logic 200 includes determining the actual outcomes at the location within the field/work site based on the received sensor data. Specifically, in several embodiments, the onboard computing system 106 is configured to analyze the sensor data received at (308) to determine the actual outcomes associated with the operation being performed by the work vehicle 10 on the field/work site. In some embodiments, the actual outcomes may include the actual engine load acting on the engine 38 of the work vehicle 10.

As shown, at (312), the control logic 300 includes controlling the ground speed of the work vehicle based on the actual outcome at each of the plurality of locations. Specifically, in several embodiments, the onboard computing system 106 is configured to determine the ground speed for the work vehicle 10 at each location within the field/work site based on the actual outcomes determined at (310) for that location. In this respect, the ground speed is determined such that all of the actual outcomes align with the expected outcomes, thereby maximizing the task rate of the work vehicle 10. As such, the onboard computing system 106 may configured to control the operation of the work vehicle 10 such that the work vehicle 10 traverses the field/work site at the determined ground speed. For example, the onboard computing system 106 may transmit control signals to the engine 38 and/or the transmission 40 via the communicative link 108. Such control signals, in turn, instruct the engine 38 and/or the transmission 40 to operate in a manner such that the vehicle 10 is propelled at the determined ground speed. Thereafter, the control logic 200 returns to (306).

In some embodiments, the ground speed may be set based on the actual engine load being placed on the vehicle 10. For example, in such embodiments, the onboard computing system 106 may determine the ground speed for each location such that the actual engine load at each location corresponds to a maximum threshold engine capacity of the work vehicle 10. The maximum threshold engine capacity is, in turn, the total engine capacity or power/torque output of the engine 38 that is permitted for use in powering the subsystems 102 of the vehicle 10 and propelling the vehicle 10 across the field/work site during the operation to be performed by the vehicle 10. In one embodiment, the maximum threshold engine capacity of the work vehicle 10 may be less than (e.g., seventy percent of, eighty percent of, ninety percent of, etc.) the maximum engine capacity of the work vehicle 10. As such, the ground speed of the vehicle 10 is set such that the entirety of the maximum threshold engine load of the work vehicle 10 is consumed by powering the subsystems 102 and propelling the vehicle 10 at each location within the field. As an example, when the maximum threshold engine capacity at a given location within the field/work site is ninety percent and the actual engine load placed on the vehicle 10 by the subsystems 102 for that location is sixty percent, the ground speed at that location will be set to consume thirty percent of the engine capacity such that a total of ninety percent of the engine capacity is used. Thus, the work/task rate of the work vehicle 10 is maximized at each location within the field/work site (e.g., by maximizing the ground speed of the work vehicle 10), while still ensuring sufficient available engine capacity to operate the various subsystems 102 of the vehicle 10 based on the actual conditions at each location.

Additionally, or alternatively, the ground speed of the work vehicle 10 may be set based on other actual outcomes in addition to engine load. For example, when the vehicle 10 transitions from harvesting a standing crop to a downed crop, the ground speed may be reduced to allow the reel and crop lifters to pick up the down crop.

A person of ordinary skill in the art will appreciate that the control logic 200 and the control logic 300 can be performed in parallel. That is, the onboard computing system 106 can determine when to apply an offset(s) to the settings in the map as part of the control logic 200 and control the ground speed of the vehicle 10 as part of the control logic 300 simultaneously or substantially simultaneously.

Figure 5:
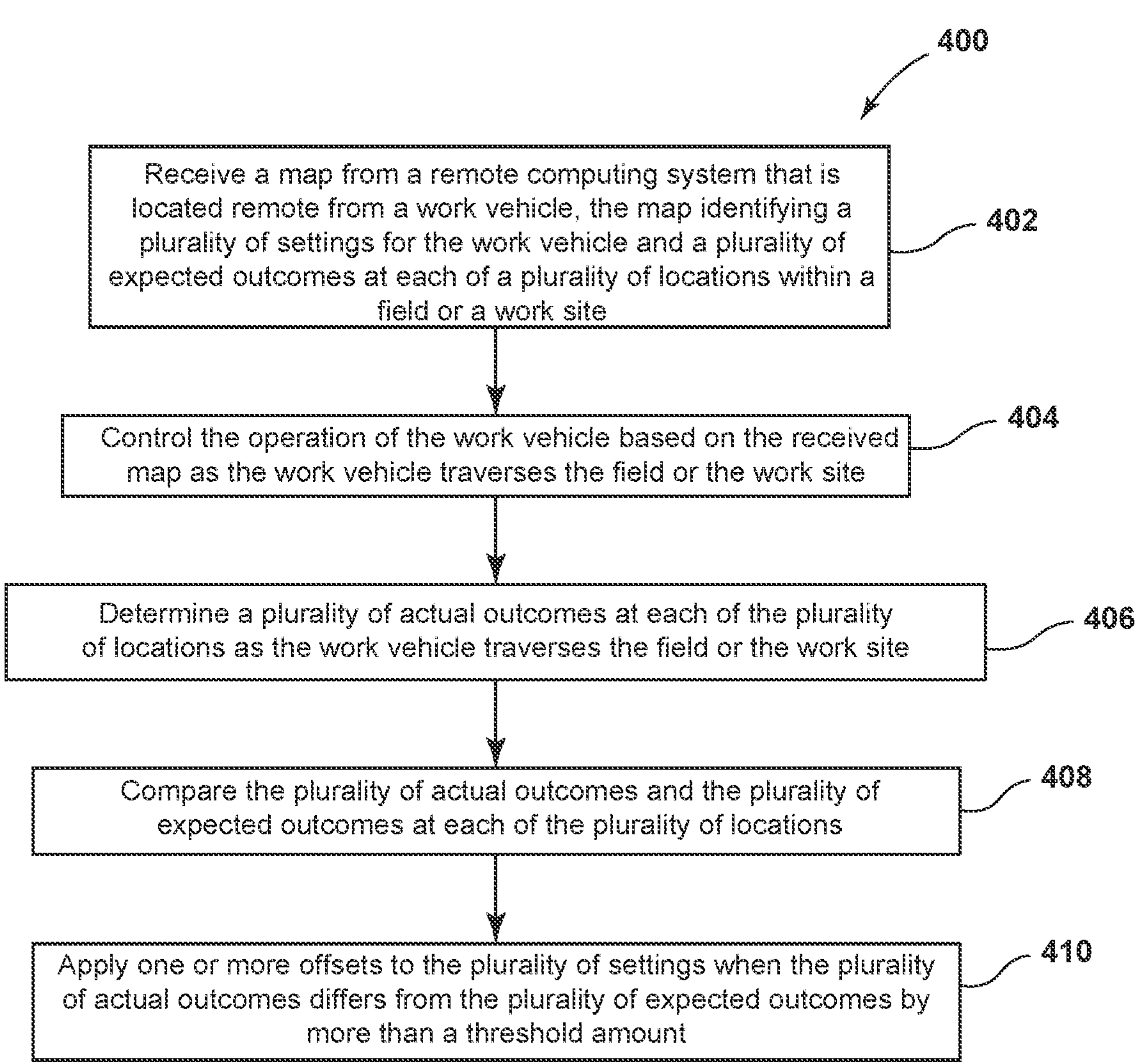
FIG. 5 illustrates a flow diagram of one embodiment of a method for automatically controlling work vehicle operation in accordance with aspects of the present subject matter.

Referring now to FIG. 5, a flow diagram of one embodiment of a method 400 for automatically controlling work vehicle operation is illustrated in accordance with aspects of the present subject matter. In general, the method 400 will be described herein with reference to the work vehicle 10 and the system 100 described above with reference to FIGS. 1-4. However, it should be appreciated by those of ordinary skill in the art that the disclosed method 400 may generally be implemented with any work vehicle having any suitable vehicle configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), the method 400 includes receiving, with an onboard computing system located on a work vehicle, a map from a remote computing system that is located remote from the work vehicle. For instance, as described above, the onboard computing system 106 may be configured to receive a map from the remote computing system 114 via the communicative link 116. The received map, in turn, identifies a plurality of settings for the work vehicle 10 and a plurality of expected outcomes at each location within the field/work site based on the conditions present at the that location and the operational capability parameters and transfer function(s) associated with the vehicle 10. Moreover, each setting is associated with the operation of at least one of the subsystems 102 of the vehicle 10.

Furthermore, at (404), the method 400 includes controlling, with the onboard computing system, the operation of the work vehicle based on the received map as the work vehicle traverses the field or the work site. For instance, as described above, the onboard computing system 106 may be configured to control the operation of the work vehicle 10 based on the received map as the work vehicle 10 traverses the field/work site.

Additionally, at (406), the method 400 includes determining, with the onboard computing system, a plurality of actual outcomes at each of the plurality of locations as the work vehicle traverses the field or the work site. For instance, as described above, the onboard computing system 106 may be configured to determine a plurality of actual outcomes at each location as the work vehicle 10 traverses the field or the work site.

Moreover, at (408), the method 400 includes comparing, with the onboard computing system, the plurality of actual outcomes and the plurality of expected outcomes at each of the plurality of locations. For instance, as described above, the onboard computing system 106 may be configured to compare the actual outcomes and the expected outcomes at each of the plurality of locations.

In addition, at (410), the method 400 includes applying, with the onboard computing system, one or more offsets to the plurality of settings when the plurality of actual outcomes differs from the plurality of expected outcomes by more than a threshold amount. For instance, as described above, the onboard computing system 106 may be configured to apply one or more offsets to the settings when the actual outcomes differ from the expected outcomes by more than a threshold amount.

It is to be understood that the steps of the control logic 200, 300 and the method 400 are performed by the onboard computing system 106 and/or the remote computing system 114 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the onboard computing system 106 and/or the remote computing system 114 described herein, such as the control logic 200, 300 and the method 400, is implemented in software code or instructions which are tangibly stored on a tangible computer readable medium. The onboard computing system 106 and/or the remote computing system 114 load the software code or instructions via a direct interface with the computer readable medium or via a wired and/or wireless network. Upon loading and executing such software code or instructions by the onboard computing system 106 and/or the remote computing system 114, the onboard computing system 106 and/or the remote computing system 114 may respectively perform any of the functionality of the onboard computing system 106 and/or the remote computing system 114 described herein, including any steps of the control logic 200, 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for automatically controlling work vehicle operation, the system comprising:

a work vehicle including a plurality of subsystems;

a remote computing system located remote from the work vehicle, wherein the remote computing system:

receives a first input indicative of a plurality of conditions present at a plurality of locations within a field or a work site;

receives a second input indicative of a plurality of operational capability parameters and one or more transfer functions associated with the work vehicle;

determines a plurality of settings for the work vehicle and a plurality of expected vehicle parameters indicative of an expected operation of the work vehicle or one or more of the plurality of subsystems during an upcoming task at each of the plurality of locations based on the plurality of conditions present at the corresponding location of the plurality of locations, the plurality of operational capability parameters, and the one or more transfer functions, each setting being associated with an operation of one or more of the plurality of subsystems; and generates a map identifying the plurality of settings and the plurality of expected vehicle parameters at each of the plurality of locations for each of the plurality of subsystems; and an onboard computing system located on the work vehicle, wherein the onboard computing system:

controls an operation of the work vehicle based on the generated map as the work vehicle traverses the field or the work site;

determines a plurality of actual outcomes at each of the plurality of locations for each of the plurality of subsystems as the work vehicle traverses the field or the work site;

compares the plurality of actual outcomes and the plurality of expected vehicle parameters at each of the plurality of locations; and applies one or more offsets to the plurality of settings to adjust the plurality of settings when the plurality of actual outcomes differs from the plurality of expected vehicle parameters by more than a threshold amount such that the adjusted plurality of settings compensates for a difference between the plurality of actual outcomes and the plurality of expected vehicle parameters.

2. The system of claim 1, wherein, when determining the plurality of actual outcomes, the onboard computing system:

receives sensor data indicative of the plurality of actual outcomes; and determines the plurality of actual outcomes at each of the plurality of locations based on the received sensor data.

3. The system of claim 1, wherein the remote computing system stores the generated map.

4. The system of claim 1, wherein the remote computing system transmits the generated map to the onboard computing system when the remote computing system is communicatively coupled to the onboard computing system.

5. The system of claim 1, wherein the first input comprises at least one of topographical data, soil type data, or weather data.

6. The system of claim 1, wherein the first input comprises at least one of planting data or harvesting data.

7. The system of claim 1, wherein the first input comprises image data depicting plants present within the field.

8. The system of claim 1, wherein the plurality of expected vehicle parameters comprises an expected engine load on the work vehicle and the plurality of actual outcomes comprises an actual engine load on the work vehicle.

9. The system of claim 1, wherein:

the plurality of expected vehicle parameters comprises at least one of an expected grain loss, an expected grain returns amount, an expected grain cleanliness parameter, or an expected grain moisture content; and the plurality of actual outcomes comprises at least one of an actual grain loss, an actual grain returns amount, an actual grain cleanliness parameter, or an actual grain moisture content.

10. A system for automatically controlling work vehicle operation, the system comprising:

a work vehicle including a plurality of subsystems;

a remote computing system located remote from the work vehicle, wherein the remote computing system:

receives a first input indicative of a plurality of conditions present at a plurality of locations within a field or a work site;

receives a second input indicative of a plurality of operational capability parameters and one or more transfer functions associated with the work vehicle;

determines a plurality of settings for the work vehicle and a plurality of expected vehicle parameters indicative of an expected operation of the work vehicle or one or more of the plurality of subsystems during an upcoming task at each of the plurality of locations based on the plurality of conditions present at the corresponding location of the plurality of locations, the plurality of operational capability parameters, and the one or more transfer functions, each setting being associated with an operation of one or more of the plurality of subsystems; and generates a map identifying the plurality of settings and the plurality of expected vehicle parameters at each of the plurality of locations for each of the plurality of subsystems; and an onboard computing system located on the work vehicle, wherein the onboard computing system:

controls an operation of the work vehicle based on the generated map as the work vehicle traverses the field or the work site;

determines a plurality of actual outcomes for each of the plurality of subsystems at each of the plurality of locations as the work vehicle traverses the field or the work site;

controls a ground speed of the work vehicle based on the plurality of actual outcomes at each of the plurality of locations;

compares the plurality of actual outcomes and the plurality of expected vehicle parameters at each of the plurality of locations; and applies one or more offsets to the plurality of settings to adjust the plurality of settings when the plurality of actual outcomes differs from the plurality of expected vehicle parameters by more than a threshold amount such that the adjusted plurality of settings compensates for a difference between the plurality of actual outcomes and the plurality of expected vehicle parameters.

11. The system of claim 10, wherein the plurality of expected vehicle parameters comprises an expected engine load and the plurality of actual outcomes comprises an actual engine load.

12. The system of claim 11, wherein, when controlling the ground speed, the onboard computing system determines the ground speed for the work vehicle at each of the plurality of locations such that the actual engine load at each location of the plurality of locations corresponds to a maximum threshold engine load.

13. The system of claim 12, wherein the maximum threshold engine capacity of the work vehicle is less than a maximum engine capacity of the work vehicle.

14. The system of claim 10, wherein:

the plurality of expected vehicle parameters comprises at least one of an expected grain loss, an expected grain returns amount, an expected grain cleanliness parameter, or an expected grain moisture content; and the plurality of actual outcomes comprises at least one of an actual grain loss, an actual grain returns amount, an actual grain cleanliness parameter, or an actual grain moisture content.

15. A method for automatically controlling work vehicle operation, the method comprising:

receiving, with an onboard computing system located on a work vehicle, a map from a remote computing system that is located remote from the work vehicle, the map identifying a plurality of settings for the work vehicle and a plurality of expected vehicle parameters indicative of an expected operation of the work vehicle or one or more of the plurality of subsystems during an upcoming task at each of a plurality of locations within a field or a work site based on a plurality of conditions present at the corresponding location of the plurality of locations and a plurality of operational capability parameters and one or more transfer functions associated with the work vehicle, each setting of the plurality of settings being associated with an operation of at least one of a plurality of subsystems of the work vehicle;

controlling, with the onboard computing system, an operation of the work vehicle based on the received map as the work vehicle traverses the field or the work site;

determining, with the onboard computing system, a plurality of actual outcomes at each of the plurality of locations as the work vehicle traverses the field or the work site for each of the plurality of subsystems;

comparing, with the onboard computing system, the plurality of actual outcomes and the plurality of vehicle parameters at each of the plurality of locations for each of the plurality of subsystems; and applying, with the onboard computing system, one or more offsets to the plurality of settings to adjust the plurality of settings when the plurality of actual outcomes differs from the plurality of expected vehicle parameters by more than a threshold amount such that the adjusted plurality of settings compensates for a difference between the plurality of actual outcomes and the plurality of expected vehicle parameters.

16. The method of claim 15, wherein determining the actual outcome comprises:

receiving, with the onboard computing system, sensor data indicative of the plurality of actual outcomes; and determining, with the onboard computing system, the plurality of actual outcomes at each of the plurality of locations based on the received sensor data.

17. The method of claim 15, wherein the first input comprises at least one of topographical data, soil type data, or weather data.

18. The method of claim 15, wherein the first input comprises at least one of planting data or harvesting data.

19. The method of claim 15, wherein the first input comprises image data depicting plants present within the field.

20. The method of claim 15, wherein the plurality of expected vehicle parameters comprises an expected engine load on the work vehicle and the plurality of actual outcomes comprises an actual engine load on the work vehicle.

* * * * *